UNITED STATES PATENT OFFICE.

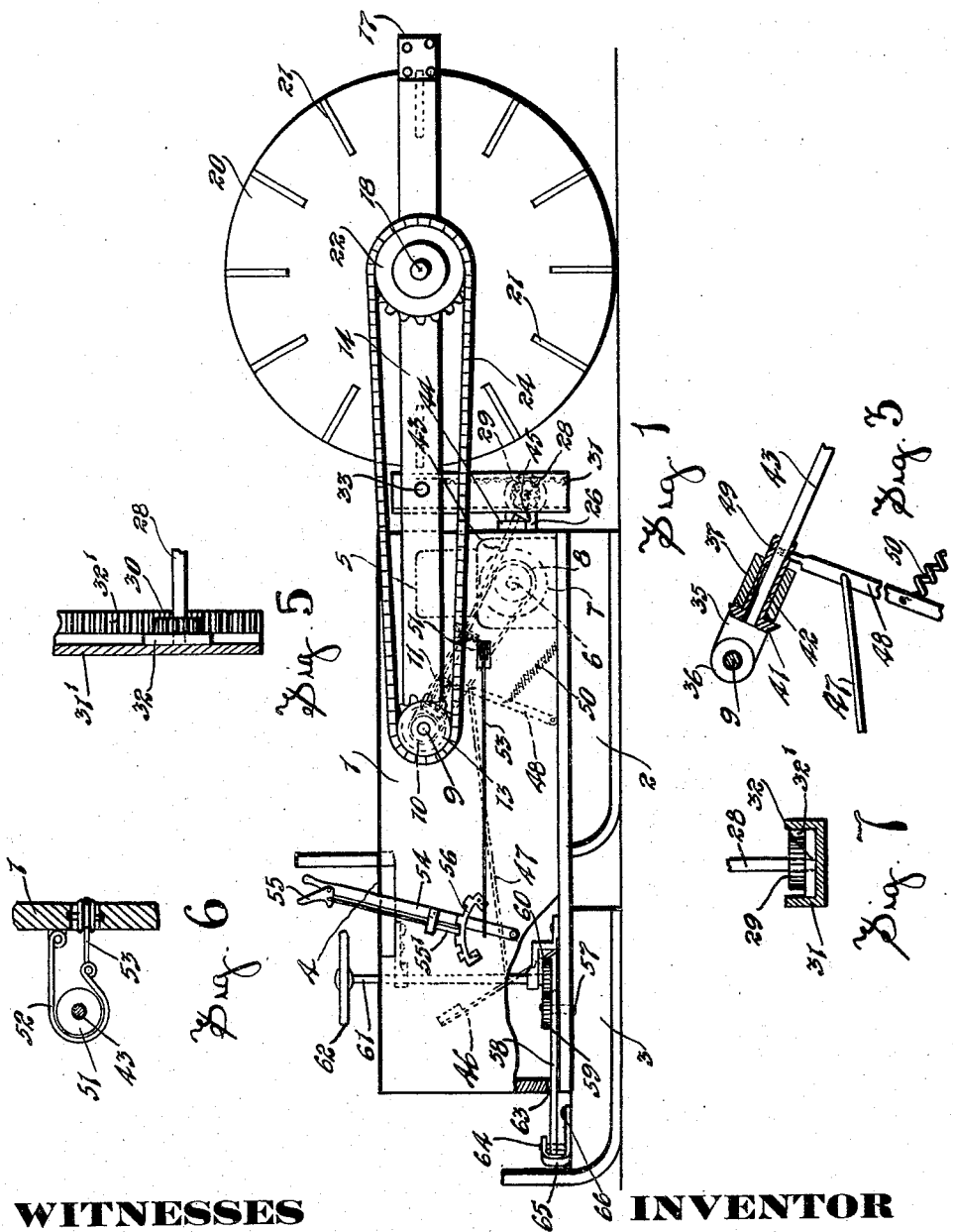

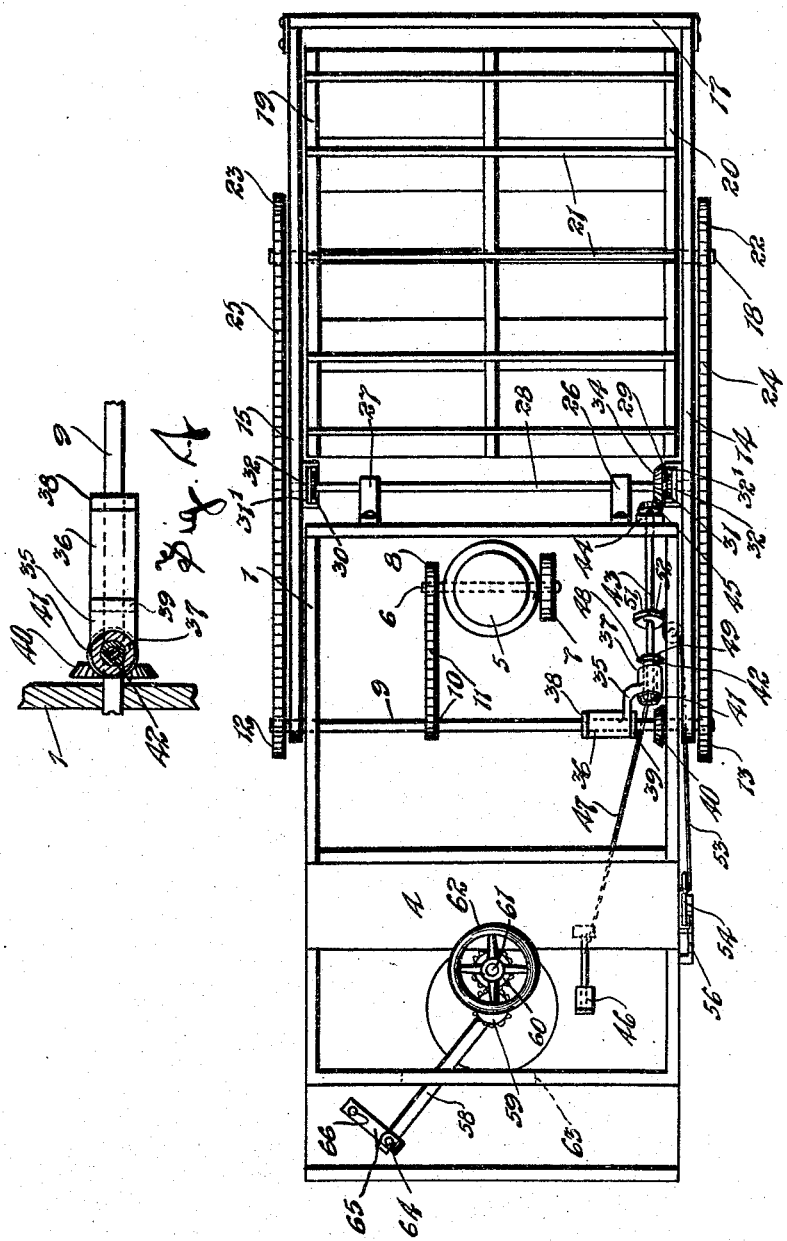

WILLIAM OWEN KILKENNY, OF BROOMHILL, MANITOBA, CANADA.

MOTOR-SLEIGH.

1,174,074. Specification of Letters Patent. Patented Mar. 7, 1916.

Application filed March 18, 1915. Serial No. 15,227.

*To all whom it may concern:*

Be it known that I, WILLIAM OWEN KILKENNY, of the village of Broomhill, in the Province of Manitoba, Canada, have invented certain new and useful Improvements in Motor-Sleighs, of which the following is the specification.

The invention relates to improvements in motor sleighs and the object of the invention is to provide a motor driven driving attachment for a sleigh whereby the same can be propelled at will over snow or ice and be at all times directly under the control of the operator.

A further object of the invention is to construct the propelling device so that it can be adjusted to take at all times a firm grip in the snow or ice on which it is operated and in so doing insure positive propulsion under the most adverse conditions.

A still further object of the invention is to provide an inexpensive and easily operated steering mechanism for the sleigh.

With the above objects in view the invention consists essentially in the arrangement and construction of parts hereinafter more particularly described and later pointed out in the appended claims.

Figure 1 represents a side view of the complete invention, part being broken away to expose construction. Fig. 2 represents a plan view of the motor sleigh. Fig. 3 represents an enlarged detailed longitudinal sectional view through the hanger and adjacent parts. Fig. 4 represents an enlarged detailed cross sectional view through the hanger and parts carried thereby. Fig. 5 represents a back view of one of the rack bars and adjacent pinion, a portion of the rack being removed to expose construction. Fig. 6 is an enlarged detailed side view of the brake wheel and band. Fig. 7 is an enlarged detailed horizontal sectional view through one of the rack bars.

In the drawings like characters of reference indicate corresponding parts in each figure.

1 represents a sleigh box mounted rearwardly on a pair of fixed back runners 2 and forwardly on a pair of front runners 3, the front runners being arranged as later described so that they can be manipulated for steering purposes.

4 represents a seat located in the front of the sleigh and 5 represents an internal combustion engine of any approved type suitably mounted in the rearmost portions of the sleigh box.

6 represents the drive shaft of the engine or motor, such shaft being supplied with a fly wheel 7 and a chain wheel 8.

9 represents a main drive shaft suitably mounted in the sides of the sleigh box and provided more or less centrally of its length with a chain wheel 10 connected by means of a chain 11 with the chain wheel 8. The opposite ends of the drive shaft, which it will be noticed protrude through the box sides are supplied with driving chain wheels 12 and 13.

14 and 15 are similar side bars having their forward ends pivotally mounted on the protruding ends of the drive shaft 9 and their rear ends extending considerably beyond the back of the box where they are connected by means of a cross bar 17.

18 is a drum shaft having the ends thereof rotatably mounted in the bars 14 and 15 in a location midway between the back of the box and the cross bar 17. The shaft carries a pair of similar end disks 19 and 20 connected by similar equally spaced blades 21 arranged toward the periphery thereof but disposed radially in respect to the disks, the blades and disks constituting what I term a propelling drum mounted on the shaft 18.

22 and 23 are chain wheels permanently secured to the ends of the drum shaft and connected by means of chains 24 and 25 with the chain wheels 12 and 13 hereinbefore mentioned. In this way it will be seen that the drum shaft and consequently the drum is driven directly from the shaft 9 which is in turn connected with the engine.

26 and 27 are a pair of brackets permanently secured to the rear end of the sleigh box and carrying a rotatably mounted counter shaft 28 supplied at the ends with specially constructed pinions 29 and 30, each operating on specially constructed rack bars 31 and 31′ having their ends pivotally connected to the side bars by pivot bolts 33. Each pinion is supplied with a disk or roller portion 32 formed integral therewith and of larger diameter than the toothed portion of the pinion. This roller portion is designed in each instance to roll or run on the inner face of the flanges of the rack bars which it will be noticed are of channel iron cross section, while the pinion proper engages with the toothed portion 32' of the bar, the toothed portion constituting the rack and being formed at the inner edge of the rearmost flange but not passing completely across the same. This construction of the pinions and rack bars allows the pinions to have an easy riding movement in the bars while avoiding side play and also prevents the rack bars from pulling away from the pinions.

34 is a bevel wheel permanently secured to the counter shaft 28.

35 is a hanger presenting two sleeves 36 and 37 disposed at right angles, one to the other. The sleeve 36 is pivotally mounted on the shaft 9, being prevented from end displacement thereon by means of collars 38 and 39 shrunk on the shaft.

40 is a bevel gear wheel permanently secured to the shaft 9 and designed to mesh with an adjoining bevel pinion 41 supplied with an extending sleeve 42 rotatably mounted in the sleeve 37.

43 is an inclined auxiliary shaft having the forward end received within the sleeve of the pinion 41 and the rear end rotatably mounted in a suitable bearing 44 secured to the sleigh box. The sleeve 42 is feathered on the shaft 43 as best shown in Fig. 4 of the drawing, this construction allowing the sleeve and consequently the pinion 41 to be moved endwise on the said shaft while using the pinion as a drive for the shaft.

45 is a pinion located on the rear end of the auxiliary shaft and meshing continuously with the bevel wheel 34.

In order that the pinion 41 can be engaged with the bevel wheel 40 at the will of the driver I have provided the following parts: 46 is a pivoted foot pedal suitably mounted in the front end of the box adjoining the seat and 47 is a link having the forward end connected with the pedal and the rear end fastened to a pivoted lever 48 having the upper end thereof forked and spanning the sleeve 42 which it will be noticed projects at the back beyond the sleeve 37. The forked ends of the lever are supplied with diametrically opposing pins which enter a groove 49 appearing in the sleeve 42. 50 is a spiral spring connected with the sleeve and the bottom of the box and designed to hold the lever back and thereby retain the pinion 41 and bevel wheel 40 out of engagement. 51 is a friction wheel permanently mounted on the shaft 43 and 52 is a brake band surrounding the wheel and arranged so that it can be tightened up to clamp on the wheel by the manipulation of a cable 53 which passes outwardly through the side of the box and is connected to a hand lever 54 located adjacent the driver's seat. The lever is supplied with the usual hand latch 55 and detent 55', the detent operating over a quadrant 56 secured to the side of the box. The front runners 3 are pivotally secured to the front of the box by means of a center pin 57 which projects upwardly through the bottom of the box and is supplied with an extending arm 58 and a pinion 59. The pinion is engaged by a gear wheel 60 located at the lower end of a suitably mounted steering post 61, said steering post being supplied with a hand wheel 62 in advance of the seat. The arm 58 projects forwardly through a slot 63 in the front of the box and is connected by a pin 64 to an L-shaped fastening bar 65 fastened by means of a pivot pin 66 to the front runners.

From the above construction it will be seen that one can manipulate the front runners by turning the hand wheel. As the hand wheel is turned the gear wheel and pinion operate to swing the arm 58 which pulls or shoves on the fastening bar and consequently effects the turning of the runners. It is remarked that the arm 58 is accommodated in its various positions by the fastening bar 65 which swings on the pivot 66.

Under normal driving conditions the pinion 41 is free of the bevel gear 40 and the friction band is clear of the friction wheel. When the engine is started the drum shaft is driven directly through the chains 24 and 25 with the result that the blades 21 advance the sleigh as the drum rides over the snow or ice. In abnormal cases where the driver wishes to have a particularly positive drive he presses the foot pedal forwardly to effect the engagement of the bevel pinion 41 with the bevel gear 40. When this occurs the auxiliary shaft drives the counter shaft in a direction such that the pinions 29 and 30 attempt to climb, so to speak, the bars. The pinions however are prevented from doing this owing to the countershaft being connected to the box by means of the hangers. Consequently the rack bars have to move and in moving they draw the side bars 14 and 15 down with the result that the weight of the back end of the sleigh is transferred to the drum, the runners being gradually raised from the ground. Accordingly a very positive drive of the sleigh can be effected under adverse driving conditions.

It is explained that as soon as the driver considers sufficient weight has been placed on the drum in the manner just described he releases the pedal and applies the brake band by manipulating the hand lever. This action stops further driving of the shaft 43 and locks the said shaft against rotation in either direction. Consequently the back runners are held in their elevated position until they are allowed to drop to the ground by the releasing of the brake band.

What I claim as my invention is:—

1. The combination with a sleigh suitably mounted on forward and rear runners, an engine mounted in the sleigh, side bars extending beyond the rear of the sleigh and having their forward ends pivotally secured thereto and a propelling drum rotatably mounted in the bars to the rear of the same, of a rotatably mounted counter shaft located at the back end of the sleigh in advance of the drum, pinions secured to the ends of the counter shaft, rack bars pivotally secured to the side bars and having the racks thereof engaged by the pinions and means for actuating the counter shaft to operate the rack bars, as and for the purpose specified.

2. The combination with a sleigh suitably mounted on forward and rear runners, an engine mounted in the sleigh, side bars extending beyond the rear of the sleigh and having their forward ends pivotally secured thereto and a propelling drum rotatably mounted in the bars to the rear of the same, of a rotatably mounted counter shaft located at the back end of the sleigh in advance of the drum, pinions secured to the ends of the counter shaft, rack bars pivotally secured to the side bars and having the racks thereof engaged by the pinions, a normally disengaged drive connection between the counter shaft and the engine, manually operated means for engaging said drive connection to effect the rotation of the counter shaft and the consequent movement of the rack bars to an adjusted position and manually operated means for retaining the rack bars in the adjusted position, as and for the purpose specified.

3. The combination with a sleigh provided with forward and rear runners, an engine mounted on the sleigh, a rotatably mounted driving shaft mounted in the sleigh and driven by the engine, side bars pivotally mounted on the engine shaft and extending beyond the rear of the sleigh and a blade carrying propelling drum mounted in the side bars to the rear of the sleigh, of a rotatably mounted counter shaft located at the back of the sleigh in advance of the drum, pinions mounted on the extremities of the counter shaft, rack bars engaging with the pinions and having their upper ends pivotally secured to the side bars, a suitably mounted auxiliary shaft interposed between the main shaft and the counter shaft and having a positive drive connection with the counter shaft, manually operated means for connecting the auxiliary shaft with the driven shaft and manually operated means preventing the reverse rotation of the auxiliary shaft, as and for the purpose specified.

Signed at Melita this 23rd day of October 1914.

WILLIAM OWEN KILKENNY.

In the presence of—
JOHN CRERAR,
C. POLLOCK.

Copies of this patent may be obtained for five cents each, by addressing the "Commissioner of Patents, Washington, D. C."